Aug. 11, 1970    YIU DAK CHI    3,523,629
LIQUID MIXING AND DISPENSING DEVICE
Filed March 11, 1968    3 Sheets-Sheet 1

INVENTOR
YIU DAK CHI

BY *Wenderoth, Lind & Ponack*
ATTORNEYS

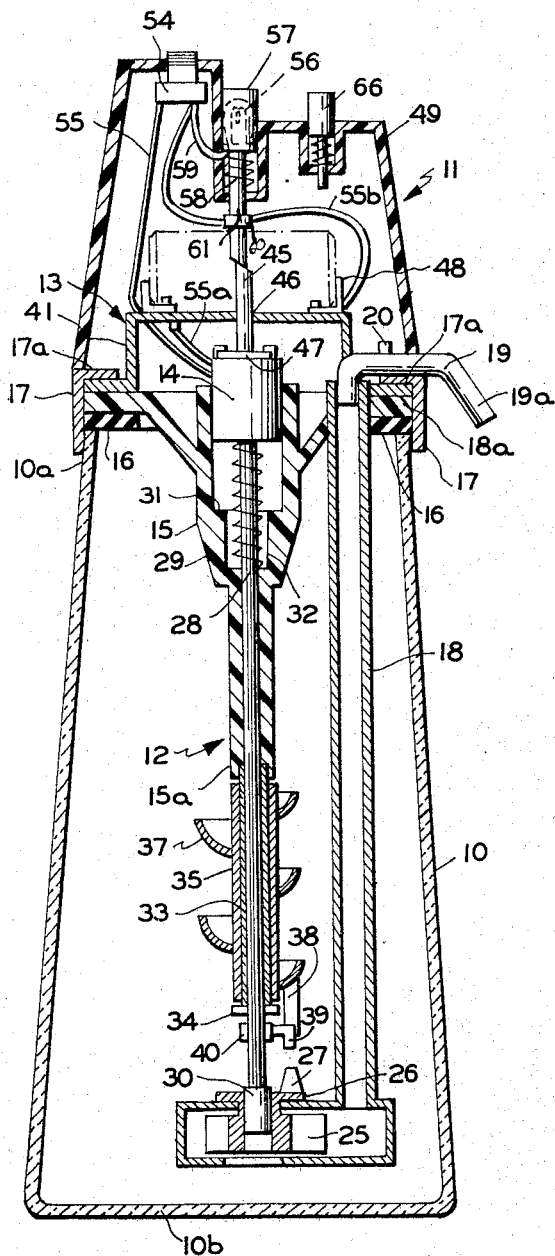

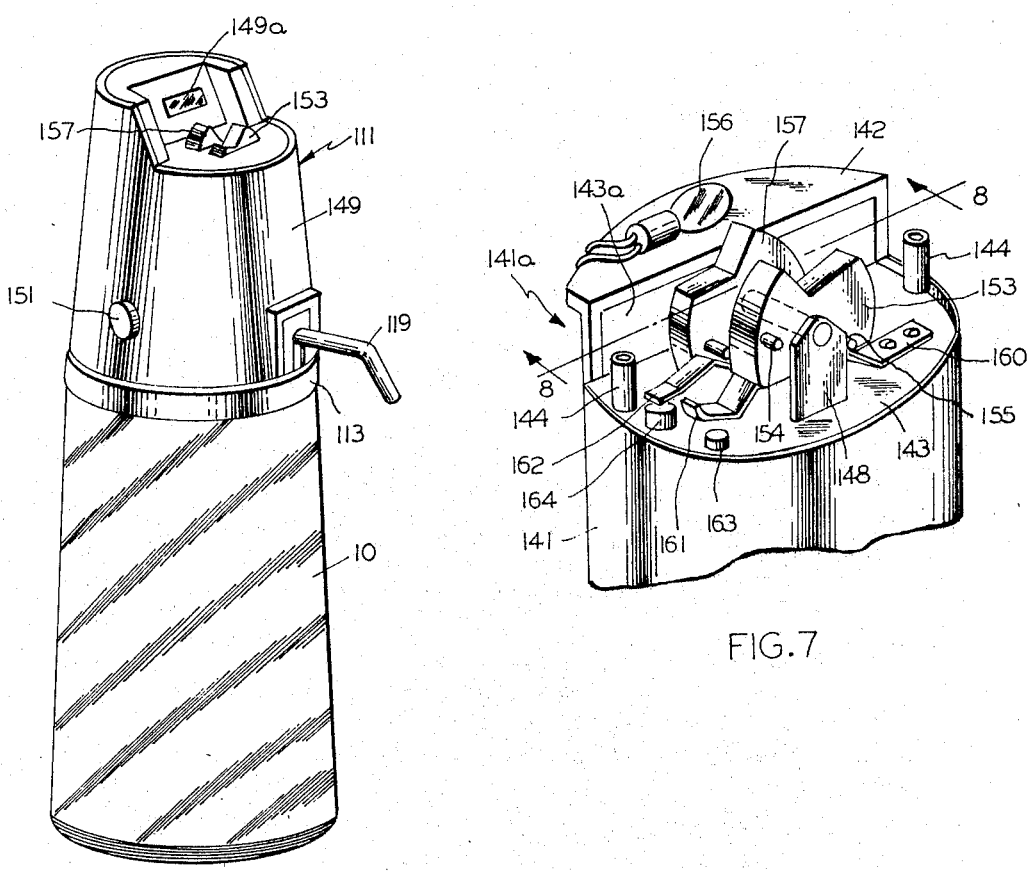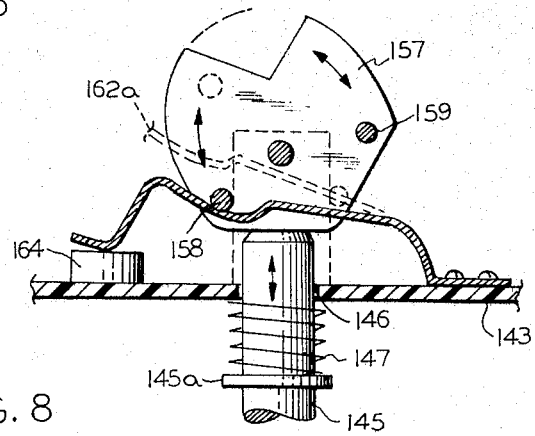

United States Patent Office 3,523,629
Patented Aug. 11, 1970

3,523,629
LIQUID MIXING AND DISPENSING DEVICE
Yiu Dak Chi, Kowloon, Hong Kong, assignor to Forda Manufacturing Company Limited, San Po Kong, Kowloon, Hong Kong
Continuation-in-part of application Ser. No. 687,725, Nov. 20, 1967. This application Mar. 11, 1968, Ser. No. 716,691
Int. Cl. B67d 5/50; F04b 49/02
U.S. Cl. 222—241
12 Claims

ABSTRACT OF THE DISCLOSURE

A mixing and pumping device for liquids. The device has a platform adapted to be positioned on a fluid containing receptacle. A shaft housing extends downwardly from the platform for immersion in the fluid in the receptacle. An impeller is rotatably mounted on said shaft housing and a pump casing is fixed on the end of said shaft housing and has an inlet opening therein. A liquid conduit means extends from said pump casing upwardly through said platform and laterally beyond the edge of said platform. Pump means is housed in said pump housing, and a shaft in said shaft housing is coupled to shaft drive means on said platform for rotating said shaft. Clutch means is provided between said shaft and said impeller and between said shaft and said pump and is selectively operative to drive said impeller or said pump.

---

This application is a continuation-in-part of my application Ser. No. 687,725, filed Nov. 20, 1967, now abandoned.

This invention relates to mixing and pumping devices for liquids and is particularly useful, but not exclusively so as a cocktail mixer for agitating the constituents of the cocktail and then dispensing the mixed constituents.

According to this invention there is provided a mixing or pumping device for liquids comprising a platform adapted to be mounted on an open-topped vessel, a motor mounted on the platform and having an output shaft arranged so as to project into the vessel, a rotary pump spaced below and supported from the platform, the pump including a casing housing a rotary pumping element, the casing having an inlet aperture for liquid in the vessel and an outlet communicating through an upwardly extending pipe with a delivery point, and the rotary pumping element being disposed coaxially with the output shaft, a mixing rotor which is mounted between the rotary pumping element and the platform for rotation coaxially with the rotary pumping element and which has external radially extending vanes, a clutch element disposed axially between the rotary pumping element and the rotor and drivingly connected to said output shaft, said pumping element and said rotor each having a dog drivingly engageable by the clutch element, and means for moving the clutch element axially into a first position in which the clutch element engages the dog on the rotor and is disengaged from the dog on the pumping element and a second position in which the clutch element engages the dog on the pumping element and is disengaged from the dog on the rotor, the arrangement being such that operation of the pump causes liquid entering said inlet aperture to be pumped up said pipe to the delivery point.

In preferred constructions according to the invention, said pipe serves to support the pump from the platform.

Figure 2:
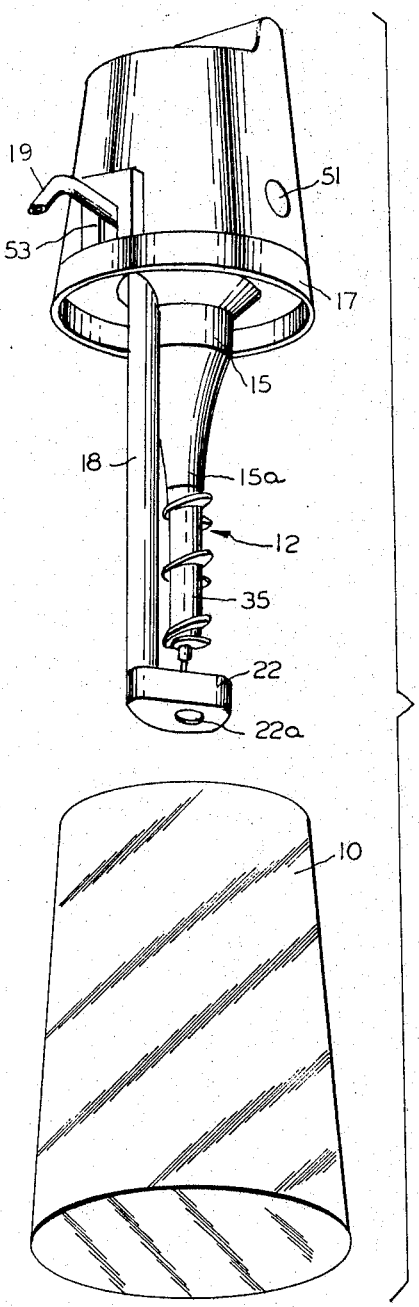
Figure 1:
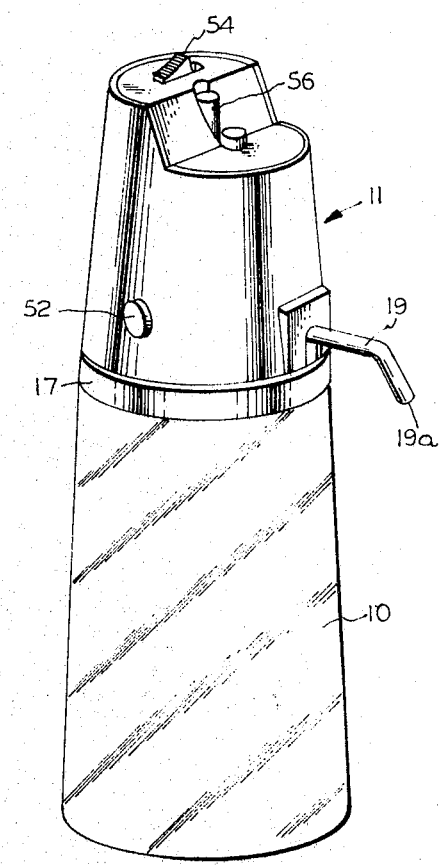

Two embodiments of the invention will now be described, by way of example, in the form of a device for mixing the constituents of a cocktail and dispensing the mixture, in connection with the accompanying drawings, in which:

FIG. 1 is a perspective view of the mixing and pumping device according to a first embodiment of the invention;
FIG. 2 is a perspective view of the cover, impeller and pump means of the embodiment of FIG. 1 removed from the container;
FIG. 3 is an axial sectional view of the mixing and pumping device of FIG. 1;
FIG. 4 is a bottom plan view of the inside of the cover taken on line 4—4 of FIG. 3;
FIG. 5 is a sectional view taken on line 5—5 of FIG. 4;
FIG. 6 is a perspective view of the mixing and pumping device according to a second embodiment of the invention;
FIG. 7 is a perspective view of the mixing head of the embodiment of FIG. 6 with the cover removed; and
FIG. 8 is a sectional view taken on line 8—8 of FIG. 7.

The device comprises principally an open-topped container 10, and resting on top of the container, a mixing head 11 comprising a mixer and pump unit 12 suspended within the container from a molded plastic platform 13 which acts as a lid for the container and supports a motor 14 for driving the unit.

The container is made from transparent glass and its walls are inclined slightly inwardly so that the glass has a somewhat smaller diameter at the upper rim 10a than at the base 10b.

A tubular center body 15 formed integrally with the platform projects downwardly through the platform into the container and narrows towards its lower end 15a terminating at about half the height of the container. The upper edge of the tubular centre body is flush with the platform. An annular rubber gasket 16 is disposed against the underside of the platform, and a metal ring 17 encircles the outer edge of the platform and has a lip 17a at its upper edge which engages over a peripheral portion of the platform. The gasket 16 rests on the upper edge 10a of the container and the ring 17 overhangs the upper edge of the container to locate the platform correctly on the mouth of the container.

The platform also has moulded integrally with it a cylindrical pipe 18 which is laterally offset from but parallel to the central tubular body 15 and which opens at its upper end 18a to the upper surface of the platform. A curved tube 19 has one end sealingly secured in the upper end 18a of the pipe 18 and extends through a notch between upstanding integral pillars 20 on the platform laterally well beyond the side of the container and has a downturned end portion 19a which is capable of depositing liquid in another vessel. A bridge piece 21 extends across the tube to clamp it in place and has its end screwed to the tops of pillars 20. To the lower end of the pipe 18 is secured a centrifugal pump casing 22. The pump casing is generally pear-shaped, viewed in plan, and is disposed so that its larger-diameter portion is disposed coaxially with the central tubular body 15 and so that its smaller diameter portion is effectively a downward continuation of the pipe 18, the pipe 18 opening to the interior of the casing 22. The bottom wall of the pump casing 22 extends parallel to the base of the container and has an inlet aperture 22a disposed coaxially with the central tubular body 15. The pump impeller 23 comprises a central hollow boss 24 having three blades 25 projecting radially from it, each of which blades extends in an axial plane. The boss extends axially through the upper wall of the casing and carries just above this wall a radial flange 26 having an offset dog 27 projecting towards the platform 13.

The small electric motor 14 is mounted within the upper portion of the tubular body 15 and its output shaft 28 extends through the body and into the hollow boss 24 of the impeller 23. The motor shaft 28 is freely rotatable in the boss of the impeller. The electric motor 14 is capable of limited axial sliding movement within the central tubular body and is spring-biased by spring 29 into an uppermost position in which an enlarged end portion 30 of the motor shaft is within the pump boss 24. Downward movement of the motor is limited by projections 31 formed internally of the tubular body and the spring 29 encircles the motor output shaft 28 at the lower side of the motor and extends between the motor casing and an abutment surface 32 formed within the tubular body 15.

An elongated bushing 33 having a radial flange 34 at its lower end projects downward from and is fixedly secured in the tubular body 15 and encircles the motor shaft 28. The part of the bushing 33 between the flange 34 and the tubular body 15 is surrounded by a mixing rotor 35 comprising a sleeve 36 having a plurality of pairs of mixing vanes 37 projecting from its external surface at even axial distances. Each pair of vanes comprises two semi-annular ribs disposed diametrically opposite each other and skew relative to the axis of the sleeve in the manner of a screw-thread but in opposite senses to each other. One of the two lowermost vanes has an axial projection or dog 38 radially offset from and projecting axially downward beyond the flange 34 of the bushing, and between this flange 34 and the adjacent flange 26 on the upper end of the pump impeller 23 the motor shaft 18 has secured to it a radially extending clutch vane 39. The spring 29 which urges the motor in an upward direction causes the boss 40 of the clutch vane 39 normally to be held close to the flange 34 on the end of the bushing 33. Operation of the motor 14 causes the clutch vane 39 to engage the dog 38 on the mixing rotor 35 so that the rotor 35 is driven and causes mixing of the contents of the container. In this position of the motor 14, the clutch vane 39 does not engage the dog 27 on the impeller 23 of the pump. When the motor 14 is depressed against the spring force, the clutch vane 39 moves out of engagement with the dog 38 on the mixing rotor 35 and engages the dog 27 on the flange 26 of the impeller 23 so that the impeller 23 is rotated and causes liquid in the container to be drawn in through the apertures 22a in the bottom face of the pump casing 22 and pumped into the pipe 18 which extends upward parallel to the motor shaft 28 and thence through the curved outlet pipe 19.

A rigid moulded plastic inner cover 41 is disposed over the motor 14 and has an out-turned fixing flange 43 which fits within an upstanding peripheral locating flange 43 on the platform 13 and through which fixing screws (not shown) are driven into the platform. For enabling the motor 14 to be depressed, a vertical rod 45 is provided which extends through an aperture 46 in the inner cover 41 and which has at its lower end a flange 47 secured to the motor casing. The rod 45 is disposed coaxially with the motor shaft 28 and has two flats, the aperture in the inner cover being correspondingly shaped to locate the motor circumferentially and to prevent rotation of the motor casing. The inner cover 41 has a slot in its periphery through which the laterally extending outlet pipe 19 projects.

Three spring metal brackets 48 are riveted to the top surface of the inner cover for mounting two electric drycell batteries and connecting them electrically in series with one another.

A rigid plastic cap 49 extends over the inner cover 41 and the lower edge thereof extends over the locating flange 42 on the platform 13 and abuts the lip of the metal locating ring 17. The platform has two upstanding spring metal lugs 50 secured to it at opposite sides, and the lugs 50 have outwardly projecting circular embossments 51 which are respectively received in apertures 52 in the lid or cap 49 to locate the latter. The lid 49 also has a notch 53 through which the outlet pipe 19 extends.

A switch 54 of the rocking type is mounted on the cap 49 and one of two electrical lead 55 is connected directly to the motor 14. Another lead 55a is connected from motor 14 to one battery terminal 48. A third lead 55b is connected from the other terminal 48 to the other side of switch 54.

Centrally of the cap, an electric bulb 56 is slidably mounted and forms a push-button aligned with the actuating rod 45 for depressing the motor 14. The bulb is secured in a plastic carrier 57 which is slidably mounted in a boss 57a in the cap and which is encircled by a compresssion spring 58 urging the bulb and holder into their uppermost positions. An electrical lead 59 extends from the "live" terminal of the switch 54 to the contact of the bulb element 56 and another lead 59a extends from bulb element 56 to a metallic nut 60 on the projecting end 61 of the plastic holder 57. A plastic latch member 62 is pivotally mounted about a vertical axis 63 within the cap and is spring-urged laterally towards the boss in which the plastic holder 57 is mounted by a spring 64. When the bulb 56 is fully depressed, the latch member 62 swings in behind the metallic nut 60 on the plastic holder 57 to prevent the holder and bulb from returning to the initial position, and a conducting member 65 carried on the latch member 62 makes electrical contact with the metallic nut 60 on the plastic holder when the plastic holder 57 is released. The said conducting member 62 is electrically connected to said other of the battery terminal brackets 48. Thus, when the bulb 56 is depressed, a circuit is completed which lights the bulb. In addition, the projecting end 61 of the plastic holder 57, when the bulb is depressed, engages the adjacent end of the actuating member 45 for the motor and pushes the motor 14 into its lowermost position and holds it there. For releasing the latch member 62 to permit the motor 14 to be raised by the spring 29, a spring loaded release button 66 is disposed adjacent the bulb 56 and when depressed engages an inclined ear 67 on the latch 62 to swing the latch laterally away from the plastic holder 57 to enable the bulb and holder to return to their original upper positions, at the same time breaking the lighting circuit for the bulb.

In operation, the required constituents are placed in the container 10 and the mixing head 11 is placed on the container. The switch 54 is operated to start the motor 14 and, since the motor 14 is held by the spring 29 in the uppermost position, the clutch vane 39 drives the mixing rotor 35. When mixing is completed, the bulb 56 is depressed to cause the actuating member 45 to push the motor 14 into its lowermost position so that the clutch vane 39 moves into driving engagement with the dog 27 on the impeller 23 of the pump so that the mixture is pumped up through the laterally extending outlet pipe 19 as previously described. When the container 10 has been emptied by the pump, the other button 66 is depressed to release the bulb 56 to cause the motor 14 and clutch vane 39 to be raised into their original positions, and the switch 54 is operated to stop the motor 14.

In the second embodiment, shown in FIGS. 6–8, the motor moving means and the switch means are different from the corresponding means of the first embodiment and are somewhat less complex in their construction. As seen from FIG. 6, the overall appearance of the device is quite similar, the mixing head 111 having the upper portion somewhat modified, but still having an outlet pipe 119 projecting through the lower portion of the cap 149 and having two apertures through which embossments 151 project for holding the cap on the moulded plastic platform 113.

The mixing head has a rigid moulded plastic inner cover 141 secured to the moulded plastic platform 113, and has a top wall 142 and an inner base 143 spaced downwardly from the top wall 142. Apertured posts 144 are provided for receiving fastening means, such as screws, for holding a cover portion (not shown), which covers the inner base 143 and the parts mounted thereon.

As seen in FIG. 8, an actuating rod 145 projects upwardly from the motor, corresponding generally to the rod 45 of the first embodiment, shown in FIG. 3, and projects through an aperture 146 in the inner base 143. A spring 147 is positioned between the inner base 143 and a flange 145a on the actuating rod, and urges the actuating rod downwardly toward the motor, although its strength is insufficient to force the motor downwardly against the action of a spring corresponding to spring 29 of the first embodiment shown in FIG. 3.

A post 148 is mounted on the inner base 143, and has journalled on the upper end thereof a shaft 152, the other end of the shaft being journalled in the back wall 143a of a battery holding compartment 141a, only one edge of which is visible in FIG. 7. The batteries are positioned vertically and side by side in the battery holding compartment.

Rotatably mounted on the shaft 152 is a cam member 157 having a cam surface on the lower portion thereof in engagement with the upper end of actuating rod 145, and curved so that on counterclockwise rotation of the shaft to the FIG. 8 position, the actuating rod is depressed so as to lower the motor and engage the clutch means with the pump impeller. Mounted on the face of the cam member 157 facing forwardly in FIG. 7 is a front cam pin 158 and a rear abutment pin 59. These pins respectively engage a second post (not visible) just in front of the cam member 157 to hold the cam member 157 in one or the other of desired rotated positions.

Also mounted on the shaft 152 is a switch member 153 also having on the front face thereof a front abutment pin 154 and a rear abutment pin 155, which pins respectively engage the post 148 in the rotated positions of the switch member 153. Each of the switch members and cam member have cut-out portions with flats thereon which project through corresponding apertures in the cap 149 to be engaged by the fingers of an operator to rotate these members.

Mounted on the inner base 143 is a spring contact 160 which has two portions extending therefrom, a switch member, actuated portion 161 which extends beneath the switch member 163, and a cam actuated portion 162 which extends beneath the front cam pin 158 on the cam member 157.

The spring contact portion 162 has a downwardly curved portion 162a therein which is engaged by the cam pin 158 and in turn engages the cam pin 158 so as to urge the cam pin toward the post and hold the cam member 157 in the counterclockwise position. This is sufficient to hold the actuating rod 145 down against the action of the spring urging the motor in the upward direction. The cam member 157 is thus locked so as to hold the motor in the down position and maintain the engagement of the clutch means and the pump impeller.

Contacts 163 and 164 are provided on the inner base 143 beneath the respective free ends of the spring contact portions 161 and 162.

An electric lamp 156 is provided on the top wall 142 and, when illuminated, shines through a transparent portion 149a of the cap 149. The batteries are series connected, and one end is connected to the spring contact 160. The other end is connected to the motor. The contact 163 is also connected to the motor so that when the portion 161 is in contact therewith, the motor is energized. The contact 164 is connected to one side of the lamp 156 and the other side of the lamp is connected to the other end of the batteries.

The remainder of the second embodiment is identical with the first embodiment.

In operation, with the switch member 153 and cam member 157 rotated in the clockwise direction, the actuating rod 145 is raised and both spring contact portions 161 and 162 are out of contact with the contacts 163 and 164. In order to actuate the motor for mixing purposes, the switch member 163 is rotated counterclockwise, thus closing the circuit through the spring contact portion 161 and contact 163. This energizes the motor, and because the clutch means is clutched to the mixing rotor, only the mixing rotor rotates, thus mixing the contents of the container 10.

When it is desired to pump the contents of the container out through the outlet pipe 119, the cam member 157 is rotated counter clockwise while leaving the switch member 153 in the counterclockwise position. This produces two actions, the lowering of the actuating rod 145, the motor, and the clutch means, so as to drive the pump impeller, and the completion of the circuit through the spring contact portion 162 and contact 146 for closing the circuit and energizing the lamp 156. The lamp is thus illuminated and a signal is given through the transparent portion 149a that the pump is operative.

Rotating both the switch member 153 and cam member 157 clockwise by a finger engaging the corresponding flats of the cut-out portions on said members opens both circuits and the device comes to a complete stop.

What is claimed is:

1. A mixing and pumping device for liquids, comprising:
    a platform adapted to be positioned adjacent a fluid containing receptacle;
    a shaft housing extending away from the platform for immersion in the fluid;
    an impeller rotatably mounted relative to said shaft housing;
    a liquid conduit means extending upwardly through said platform and laterally beyond the edge of said platform;
    a pump casing fixed on the end of said liquid conduit means and having an inlet opening therein;
    pump means in said pump casing;
    a shaft in said shaft housing;
    a motor on said platform coupled to said shaft for rotating said shaft; and
    clutch means on said shaft selectively movable in the direction of the length of the shaft for engaging said impeller or said pump means and rotating the impeller or the pump means with rotation of the shaft.

2. A mixing and pumping device as claimed in claim 1 in which said shaft is secured to said motor, and said motor is mounted on said platform for movement in the direction of the length of said shaft, and said clutch means is a clutch vane secured to said shaft, the movement of said clutch vane to engage said impeller or said pump means being by movement of said motor in the direction of the length of said shaft.

3. A mixing and pumping means as claimed in claim 2 in which spring means is provided in said platform urging said motor away from said platform in the direction opposite from the direction said shaft housing extends, whereby said clutch vane is normally engaged with said impeller, and motor moving means on said platform for moving said motor against the action of said spring.

4. A mixing and pumping means as claimed in claim 3 in which said platform has a cover thereon and said motor moving means comprises a button slidable in said cover in the direction of the length of the shaft and engageable with said motor.

5. A mixing and pumping means as claimed in claim 4 in which said motor moving means further includes latch means for engaging said button for holding the button and hence the motor in the depressed position, and release means movable in said cover for engaging said latch means for releasing said latch means.

6. A mixing and pumping means as claimed in claim 5 in which said button is a spring loaded button spring loaded for movement away from said motor, and a flange on the end thereof toward said motor, and said latch means comprises a latch pivotally mounted on said cover for swinging movement transversely to the direction of movement of said button and engageable behind said flange for holding the button in the depressed position, and spring means coupled to said latch urging said latch to the latching position, and said release means comprises a release button engageable with said latch for swinging said latch away from the button against the action of said spring means.

7. A mixing and pumping means as claimed in claim 4 in which said motor is an electric motor, and said platform has battery mounting means thereon electrically connected to said motor, and switch means coupled between the battery mounting means and said motor.

8. A mixing and pumping means as claimed in claim 4 in which said button has a lamp therein, and electric supply means coupled to said lamp for lighting said lamp when the button is in the depressed position.

9. A mixing and pumping means as claimed in claim 7 in which said switch means comprises a rotatable switch member rotatably mounted on said platform and a leaf spring contact moved from an open position to a closed position when the switch member is rotated from a first rotational position to a second rotational position and moved from the closed position to the open position when the switch member is moved from the second to the first rotational position.

10. A mixing and pumping means as claimed in claim 3 in which said platform has a cover thereon and said motor moving means comprises a cam member rotatably mounted on said platform, an actuating shaft engaging said motor and engaged by said cam member and moved in the downward direction by said cam member when said cam member is rotated.

11. A mixing and pumping means as claimed in claim 10 in which said motor moving means further includes means for holding said motor in the depressed position and comprising a concavely curved leaf spring member, said cam member having a cam pin thereon projecting parallel to the axis of rotation thereof and engageable with the concavely curved portion of said leaf spring member, and a post adjacent said cam member against which said cam pin bears in the rotated position of said cam member in which said motor is depressed with said concavely curved portion of said spring member holding said cam pin against said post.

12. A mixing and pumping means as claimed in claim 11 in which said leaf spring member has one end connected to a power supply, a contact beneath the free end of said leaf spring member, a lamp connected to the power supply, said contact being connected to said lamp, whereby the lamp is illuminated when the leaf spring member is engaged and depressed by the cam pin to show that the pump is engaged.

References Cited
UNITED STATES PATENTS

| | | | |
|---|---|---|---|
| 2,170,720 | 8/1939 | Kestenbaum | 222—333 X |
| 2,353,871 | 7/1944 | Bowen | 103—23 X |
| 3,130,878 | 4/1964 | Zimmerman | 222—382 X |
| 3,289,897 | 12/1966 | Ginsberg | 222—239 |

ROBERT B. REEVES, Primary Examiner

F. R. HANDREN, Assistant Examiner

U.S. Cl. X.R.

103—23; 222—333, 385